May 21, 1935. H. HAUPT Re. 19,576
TELESCOPIC UMBRELLA
Original Filed Aug. 16, 1930
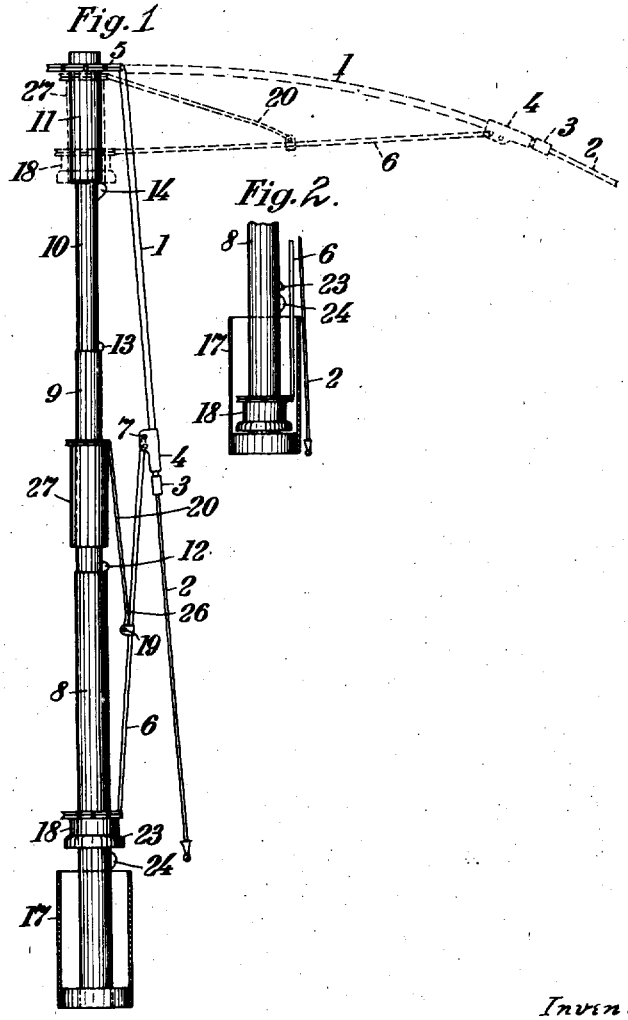
Inventor.
Hans Haupt.

Reissued May 21, 1935 Re. 19,576

UNITED STATES PATENT OFFICE 19,576

TELESCOPIC UMBRELLA

Hans Haupt, Berlin, Germany

Original No. 1,902,363, dated March 21, 1933, Serial No. 475,647, August 16, 1930. Application for reissue March 19, 1935, Serial No. 11,832. In Germany July 19, 1930

8 Claims. (Cl. 135—25)

This invention relates to a collapsible umbrella of the kind wherein the stretchers are pivoted to the outer rib sections and supported by auxiliary struts, and the invention consists essentially in connecting the upper ends of the struts to a sleeve which is arranged to slide on the telescopic umbrella stick.

This arrangement has the advantage that, as the sleeve moves over the stick sections and the catches therefor, a resistance will be offered to the sleeve which re-acts by means of the struts on the stretchers so as to extend the outer rib sections before the ribs are bent enough to hinder such extension.

This effect is enhanced by making the uppermost stick section larger than the contiguous lower section so that it can act frictionally on the sleeve.

Fig. 1 of the accompanying drawing represents a side view, partly in section, of the improved umbrella frame in closed position, only one of the ribs and its accompanying parts being shown, and Fig. 2 is a sectional view of the lower part of the frame in collapsed position.

The umbrella comprises rib sections 1 and 2 which are slidably connected to each other by means of rings 3 and 4, the sections 1 being pivoted to the crown 5. The stretchers 6 are connected by joints 7 to the rings 4 of the outer rib sections 2. The stick is composed of telescopic sections 8, 9, 10, and 11 which are locked by catches 12, 13, and 14 preventing longitudinal relative displacement. Connected to the lower end of the stick section 8 is a tubular handle 17. The latter can, after the catch 12 has been depressed, slide over the main runner 18 between the stretchers 6 and the ribs 2 while the stick section 8 slides over and depresses the catches 13 and 14 so as to allow the upper stick sections to collapse. The runner is locked by the catch 14 with the umbrella frame in open position. Connected to each stretcher by means of a joint 19 is an auxiliary strut 20 which, when the umbrella is opened, supports the stretcher and helps it to extend the outer rib section 2.

In the closed position of the umbrella frame, the runner 18 is locked by a catch 23 provided, under the runner, with a nose 24 whereby the catch can be operated for releasing the runner. On the collapse of the umbrella frame the runner slides over the nose 24 and moves to the bottom of the handle, as shown in Fig. 2, and the catch 23 remains in position to re-engage the runner and ensure a simultaneous extension of stick and ribs.

The auxiliary struts are made of springy material and are formed with knees 26 whereby they, on the closing of the umbrella, engage the stretchers 6 and exert thereon an outward thrust whereby the re-opening of the umbrella is facilitated.

While the auxiliary struts 20 are connected at one end, by means of the joints 19, to the stretcher 6, the other end is connected to a sleeve or auxiliary runner 27 which slides on the stick. This sleeve is freely slidable. However, since it is connected to the auxiliary struts, it can only move together with all the latter. Thus, on the handle 7 being pushed over the stretchers 6, the sleeve and struts co-operate to support the stretchers. The joints 19 of the struts 20 are arranged on the stretchers 6 outside the position to which the handle can be pushed. Thus the handle is prevented from acting with too great force on the joints 7 so as to hinder the relative sliding movement of the rib sections.

The stick section 11 over which the slide 27 passes on the opening of the umbrella, larger than the contiguous lower section, is adapted to resist the movement of the slide, thereby reacting by means of the struts on the stretchers 6 so as to extend the outer rib sections 2 before the ribs are bent enough to hinder such extension.

The runner 18 is adapted to move on to the sleeve 27 on the opening of the umbrella. On the closing of the umbrella the sleeve 27 will not be retained by the catch 14 since it moves on to the catch while the latter is depressed by the runner. When the umbrella is opened, the catch 14 acts as an initial resistance to the sleeve 27, thereby assisting the struts and the stretchers in extending the outer rib sections.

The umbrella is used as follows:

When it is desired to close the open umbrella the spring catch 14 is pressed inwardly and the main runner 18 is drawn downwardly towards the handle, and so far that the ribs 1, 2 are extended when the umbrella is closed. The auxiliary runner 27 is freely slidable on the stick so far that the said downward movement of the runner 18 is possible. Now the main runner 18 is locked in position by the spring catch 23, 24, and the outer rib sections 2 are held thereby in extended position through the intermediary of the main stretchers 6. The wet umbrella may be carried in this position so as to permit the water to flow off the cover and to allow the cover to dry by the access of air thereto.

If it is desired then to raise the umbrella, the main runner 18 is released from the spring catch 23, 24 and shifted upwardly. The auxiliary runner 27 which is freely movable on the stick takes part in such movement and also the rings 4 of the outer rib sections are slightly moved upwardly upon the inner rib sections. Near the end of the upward movement of the system the auxiliary runner 27 engages the spring catch 14 from below, and it finds a certain resistance, so that now the auxiliary struts 20 provide fulcrums for the main stretchers 6, which therefore are turned outwardly with their outer ends and extend the outer rib sections. After the ribs 1, 2 have thus been completely extended, the auxiliary runner 27 passes above the spring catch 14, and it engages the crown 5. By this further movement of the auxiliary runner the ribs 1, 2 are bent into the curved shape shown in Fig. 1 in broken lines thus expanding the cover.

If it is desired to collapse the umbrella from the position shown in Fig. 1 in full lines, the handle 17 is pushed upwardly together with the stick section 8 carrying the same and the spring catch 24. Thus the tubular handle advances with its tubular wall surrounding the runner 18 and into the space between the lower portion of the stretchers 6 and the rib sections 2. In this movement the spring catch 23, 24 is slightly pushed inwardly by the runner 18 and releases the same, which is important, because thereby the runner 18 and the rib sections 2 may yield to the advance of the tubular wall of the handle 17, so that there is no danger of the cover being injured by the advance of the handle between the stretchers 6 and the rib sections 2. The tubular wall of the handle 17 now holds the stretchers 6 near the stick, but it prevents the ribs from coming close to the stretchers 6, and it holds the same substantially in an angular position similar to that shown in Fig. 1, so that there is no danger, as the parts collapse, of the joints 19 striking the rings 3. By the upward movement of the runners 18 and 27 the rings 4 slide on the inner rib sections 1, thus shifting the outer rib sections 2 on the inner rib sections 1. Simultaneously the stick sections 8, 9, 10 and 11 are telescopically shifted into one another. After the stick and the ribs have thus been collapsed, the parts are in the positions shown in Fig. 2, the runner 18 being close to the bottom part of the handle 17, the rib sections 2 bearing on the outer surface of the handle 17, and the projecting spring catch 23, 24 being located above the runner 18; the top or inner part of the cover is collapsed upon the bottom or outer part thereof; and the collapsed umbrella may be put into a sheath.

If it is desired to extend the umbrella from the collapsed position, the top end and the handle are grasped by the hands and drawn apart. Now as the stick sections are extended the spring catch 23, 24 engages the runner 18 and carries the same along, so that the stick sections as well as the rib sections are extended. The spring catch 23 is now in locking engagement with the runner 18, as is shown in Fig. 1 in full lines. Thereafter the umbrella may be raised in the manner described above.

From the foregoing description it will be understood that the user, when he is about to extend the collapsed umbrella, grasps only the top end and the handle of the umbrella, and therefore he does not compress in his grasp the ribs of the collapsed umbrella. This would be objectionable for the reason that thereby the ribs would be pressed upon the stretchers 6, and upon the stick; the movement of the parts would then be hindered, because certain parts and more particularly the joints would engage one another and interfere with free movement.

Sometimes the user may extend the collapsed umbrella by grasping the handle and with it the ends of the rib sections 2 that rest thereon. By virtue of the construction of the handle, this way of extending the umbrella is not injurious, the said handle providing a support for the rib sections 2 preventing the same from being pressed towards the stick and into engagement with the main stretchers and the joints 19 of the auxiliary struts 20. In such case, however, after the parts have been partly extended, the user, continuing his hold upon the handle, will release the rib sections 2 and then in continuing the extension of the umbrella he will allow the main runner 18 to advance and function in the manner described, until at length all the parts have been fully extended and locked in the positions shown in full lines in Fig. 1.

I claim as my invention:

1. An umbrella of the character described, comprising a stick composed of telescopically connected sections, ribs composed of slidably connected sections, a runner on the stick, stretchers connecting said runners with the outer rib sections, a sleeve arranged to slide on the stick, and auxiliary struts pivoted at one end to said sleeve and at the other end to the central portions of the stretchers for supporting the latter in the open position of the umbrella, said struts being formed with knees adapted to bear against and exert outward pressure on the stretchers when the umbrella is closed.

2. An umbrella as claimed in claim 1 wherein the uppermost stick section is larger than the contiguous lower section and is adapted to offer frictional resistance to the sleeve, substantially as and for the purpose set forth.

3. An umbrella as claimed in claim 1 wherein the uppermost stick section is larger than the contiguous lower section, a catch on said lower section adapted to retain the uppermost section in extended position, said catch adapted to offer frictional resistance to the upward movement of the sleeve on the latter passing the catch substantially as and for the purpose set forth.

4. A collapsible umbrella comprising a stick composed of telescoping sections and its handle, ribs composed each of an inner and an outer section in telescoping engagement with each other and bearing when extended on the extended stick, a main runner, main stretchers pivoted at their inner and outer ends respectively to said main runner and to the inner ends of said several outer rib sections, an auxiliary runner, auxiliary stretchers pivoted at their inner and outer ends respectively to said auxiliary runner and to said several main stretchers at points intermediate the ends thereof, said main and auxiliary runners being slidable on said stick towards said handle so far that the umbrella is closed with the sections of the ribs extended when the runners are shifted downwardly, and a locking device on said stick in position for locking said main runner in the position in which the rib sections are extended.

5. The structure of claim 4, said locking device being located when the umbrella is collapsed in position for engaging and carrying along the said main runner when the umbrella is extended from collapsed position into closed and non-collapsed position.

6. The structure of claim 4, said locking device being mounted on one of said stick sections and being located in the collapsed umbrella above said main runner and projecting from the said stick section so as to be in position for engaging and carrying along said main runner when the umbrella is extended.

7. The structure of claim 4, the handle being tubular and mounted on the lower stick section and adapted, when the umbrella is collapsed, to extend within the outer ends of the outer rib sections.

8. The structure as claimed in claim 1, comprising in addition a spring catch near the top part of the stick adapted when the umbrella is being expanded to offer yielding resistance to the subsidiary runner and to lock the main runner in position with the umbrella expanded.

HANS HAUPT.